United States Patent
Alizadeh-Shabdiz et al.

(10) Patent No.: US 7,856,234 B2
(45) Date of Patent: Dec. 21, 2010

(54) SYSTEM AND METHOD FOR ESTIMATING POSITIONING ERROR WITHIN A WLAN-BASED POSITIONING SYSTEM

(75) Inventors: Farshid Alizadeh-Shabdiz, Wayland, MA (US); Edward J. Morgan, Needham, MA (US)

(73) Assignee: Skyhook Wireless, Inc., Boston, MA (US)

( * ) Notice: Subject to any disclaimer, the term of this patent is extended or adjusted under 35 U.S.C. 154(b) by 871 days.

(21) Appl. No.: 11/625,450

(22) Filed: Jan. 22, 2007

(65) Prior Publication Data
US 2008/0108371 A1      May 8, 2008

Related U.S. Application Data

(60) Provisional application No. 60/864,716, filed on Nov. 7, 2006.

(51) Int. Cl.
*H04W 24/00* (2009.01)
*H04W 4/00* (2009.01)
*H04M 11/04* (2006.01)
*G01S 5/02* (2010.01)

(52) U.S. Cl. ............ 455/456.1; 455/404.2; 342/420; 370/338

(58) Field of Classification Search ......... 455/456.1, 455/456.5, 456.6, 41.2, 404.2, 407, 408; 342/385, 420; 370/328, 338
See application file for complete search history.

(56) References Cited

U.S. PATENT DOCUMENTS

| | | | |
|---|---|---|---|
| 6,272,405 B1 | 8/2001 | Kubota et al. | |
| 6,678,611 B2 | 1/2004 | Khavakh et al. | |
| 6,888,811 B2 | 5/2005 | Eaton et al. | |
| 6,978,023 B2 | 12/2005 | Dacosta | |
| 7,123,928 B2 | 10/2006 | Moeglein et al. | |
| 7,167,715 B2 | 1/2007 | Stanforth | |
| 7,167,716 B2 | 1/2007 | Kim et al. | |
| 7,305,245 B2 | 12/2007 | Alizadeh-Shabdiz et al. | |

(Continued)

FOREIGN PATENT DOCUMENTS

EP      1612999 A1      1/2006

(Continued)

OTHER PUBLICATIONS

U.S. Appl. No. 11/261,848, Morgan et al.

(Continued)

*Primary Examiner*—Un C Cho
(74) *Attorney, Agent, or Firm*—Wilmer Cutler Pickering Hale and Dorr LLP

(57) ABSTRACT

The invention features a method of estimating an expected error of a position estimate for use in a WLAN positioning system that estimates the position of a WLAN-enabled device. The WLAN-enabled device receives signals transmitted by a WLAN access point in range of the WLAN-enabled device. The method estimates the position of the WLAN-enabled device based on the received signals from the WLAN access point in range of the WLAN enabled device. The method also estimates an expected error of the position estimate based on characteristics of the WLAN access point in range of the WLAN enabled device, wherein the expected error predicts a relative accuracy of the position estimate.

22 Claims, 4 Drawing Sheets

U.S. PATENT DOCUMENTS

| | | |
|---|---|---|
| 7,397,424 B2 | 7/2008 | Houri |
| 7,403,762 B2 | 7/2008 | Morgan et al. |
| 7,414,988 B2 | 8/2008 | Jones et al. |
| 7,433,696 B2 * | 10/2008 | Dietrich et al. .......... 455/456.2 |
| 2003/0118015 A1 | 6/2003 | Gunnarsson et al. |
| 2003/0125045 A1 | 7/2003 | Riley et al. |
| 2003/0225893 A1 | 12/2003 | Roese et al. |
| 2004/0019679 A1 | 1/2004 | E et al. |
| 2004/0039520 A1 | 2/2004 | Khavakh et al. |
| 2004/0057408 A1 * | 3/2004 | Gray .......................... 370/338 |
| 2004/0087317 A1 | 5/2004 | Caci |
| 2004/0203880 A1 | 10/2004 | Riley |
| 2004/0203904 A1 * | 10/2004 | Gwon et al. ............. 455/456.1 |
| 2004/0205234 A1 | 10/2004 | Barrack et al. |
| 2005/0003827 A1 | 1/2005 | Whelan |
| 2005/0020266 A1 | 1/2005 | Backes et al. |
| 2005/0037775 A1 | 2/2005 | Moeglein et al. |
| 2005/0073980 A1 | 4/2005 | Thomson et al. |
| 2005/0192024 A1 | 9/2005 | Sheynblat |
| 2005/0208919 A1 | 9/2005 | Walker et al. |
| 2006/0009235 A1 | 1/2006 | Sheynblat et al. |
| 2006/0072502 A1 | 4/2006 | Crandall et al. |
| 2006/0078122 A1 | 4/2006 | Dacosta |
| 2006/0095348 A1 | 5/2006 | Jones et al. |
| 2006/0095349 A1 | 5/2006 | Morgan et al. |
| 2006/0197704 A1 | 9/2006 | Luzzatto et al. |
| 2006/0200843 A1 | 9/2006 | Morgan et al. |
| 2006/0217131 A1 | 9/2006 | Alizadeh-Shabdiz et al. |
| 2006/0229088 A1 | 10/2006 | Walter |
| 2006/0240840 A1 | 10/2006 | Morgan et al. |
| 2007/0004427 A1 | 1/2007 | Morgan et al. |
| 2007/0004428 A1 | 1/2007 | Morgan et al. |
| 2007/0018891 A1 * | 1/2007 | Golden et al. ............... 342/420 |
| 2007/0097511 A1 | 5/2007 | Das et al. |
| 2007/0121560 A1 * | 5/2007 | Edge .......................... 370/338 |
| 2007/0126635 A1 | 6/2007 | Houri |
| 2007/0150516 A1 | 6/2007 | Morgan et al. |
| 2007/0202888 A1 | 8/2007 | Brachet et al. |
| 2007/0232892 A1 | 10/2007 | Hirota |
| 2007/0258408 A1 | 11/2007 | Alizadeh-Shabdiz et al. |
| 2007/0258409 A1 | 11/2007 | Alizadeh-Shabdiz et al. |
| 2007/0258420 A1 | 11/2007 | Alizadeh-Shabdiz et al. |
| 2007/0258421 A1 | 11/2007 | Alizadeh-Shabdiz et al. |
| 2007/0259624 A1 | 11/2007 | Alizadeh-Shabdiz et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008120 A1 | 1/2008 | Alizadeh-Shabdiz |
| 2008/0008121 A1 | 1/2008 | Alizadeh-Shabdiz |
| 2008/0033646 A1 | 2/2008 | Morgan et al. |
| 2008/0108319 A1 * | 5/2008 | Gallagher ................ 455/404.2 |
| 2008/0108371 A1 | 5/2008 | Alizadeh-Shabdiz et al. |
| 2008/0132170 A1 | 6/2008 | Alizadeh-Shabdiz et al. |
| 2008/0139217 A1 | 6/2008 | Alizadeh-Shabdiz et al. |
| 2008/0176583 A1 | 7/2008 | Brachet et al. |
| 2009/0075672 A1 | 3/2009 | Jones et al. |
| 2009/0149197 A1 | 6/2009 | Morgan et al. |
| 2009/0154371 A1 | 6/2009 | Alizadeh-Shabdiz et al. |
| 2009/0175189 A1 | 7/2009 | Alizadeh-Shabdiz et al. |
| 2009/0252138 A1 | 10/2009 | Alizadeh-Shabdiz et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0052983 A1 | 3/2010 | Alizadeh-Shabdiz |

FOREIGN PATENT DOCUMENTS

| | | |
|---|---|---|
| WO | WO-03102620 A1 | 12/2003 |
| WO | WO-2005-121829 A1 | 12/2005 |
| WO | WO-2006-070211 A1 | 7/2006 |
| WO | WO-2006-117587 A1 | 11/2006 |
| WO | WO-2007/133967 | 11/2007 |
| WO | WO-2007/133968 | 11/2007 |

OTHER PUBLICATIONS

Hazas, M., et al., "Location-Aware Computing Comes of Age," IEEE, vol. 37, Feb. 2004.

Krumm, J., et al., "LOCADIO: Inferring Motion and Location from Wi-Fi Signal Strengths," First Annual International Conference on Mobile and Ubiquitous Systems: Networking and Services, Aug. 2004.

Muthukrishnan, K., et al., "Towards Smart Surroundings: Enabling Techniques and Technologies for Localization," Lecture Notes in Computer Science, vol. 3479, May 2005.

U.S. Appl. No. 11/625,450, Alizadeh-Shabdiz.

Griswold et al., "ActiveCampus—Sustaining Educational Communities through Mobile Technology." UCSD CSE Technical Report #CS200-0714, 2002.

Hellebrandt, M., et al., "Estimating Position and Velocity of Mobile in a Cellular Radio Network," IEEE Transactions on Vehicular Technology, vol. 46, No. 1, Feb. 1997.

International Search Report, International Application No. PCT/US05/39208, mailed Jan. 29, 2008. (3 pages).

Kim, M., et al., "Risks of using AP locations discovered through war driving," Lecture Notes in Computer Science, vol. 3968, 2006.

Kirsner, S., "One more way to find yourself," The Boston Globe, May 23, 2005, Retrieved from www.boston.com.

LaMarca, A., et al., "Place Lab: Device Positioning Using Radio Beacons in the Wild," Intel Corporation, 2004.

International Search Report, International Patent Application No. PCT/US07/81929, mailed Apr. 16, 2008 (2 pages).

International Search Report and Written Opinion of the International Searching Authority, the United States Patent and Trademark Office, for International Application No. PCT/US2007/068248, mailing date of Aug. 6, 2008, 4 pages.

International Search Report and Written Opinion of the International Searching Authority, the United States Patent and Trademark Office, for International Application No. PCT/US2007/068251, mailing date of Aug. 25, 2008, 6 pages.

International Search Report and Written Opinion of the International Searching Authority, the United States Patent and Trademark Office, for International Application No. PCT/US2010/041279, mailing date of Sep. 1, 2010, 7 pages.

European Search Report and Written Opinion for EP07783288, dated Jun. 3, 2010, 7 pages.

Supplementary European Search Report and Written Opinion for EP07761894, dated Jun. 3, 2010, 8 pages.

Supplementary European Search Report and Written Opinion for EP07868513, dated Jun. 7, 2010, 5 pages.

* cited by examiner

SYSTEM AND METHOD FOR ESTIMATING POSITIONING ERROR WITHIN A WLAN-BASED POSITIONING SYSTEM

CROSS-REFERENCE TO RELATED APPLICATIONS

This application claims the benefit under 35 U.S.C. §119(e) of U.S. Provisional Patent Application No. 60/864,716, filed on Nov. 7, 2006, entitled Estimating Positioning Error for a WLN Based Positioning System, which is herein incorporated by reference in its entirety.

This application is related to the following U.S. Patent Applications, the contents of which are hereby incorporated by reference:

U.S. patent application Ser. No. 11/261,987, entitled Method and System for Building a Location Beacon Database, filed on Oct. 28, 2005;

U.S. patent application Ser. No. 11/430,079, Estimation Of Speed and Direction of Travel In A WLAN Positioning System, filed on May 8, 2006;

U.S. patent application Ser. No. 11/430,064, Estimation of Speed and Direction of Travel In A WLAN Positioning System Using Multiple Position Estimations, filed on May 8, 2006;

U.S. patent application Ser. No. 11/430,222, Estimation of position Using WLAN Access Point Radio Propagation Characteristics In a WLAN Positioning System, filed on May 8, 2006; and U.S. patent application Ser. No. 11/430,224, Calculation of Quality of WLAN Access Point Characterization for Use In a WLAN Positioning System, filed on May 8, 2006.

BACKGROUND

1. Field of the Invention

The invention generally relates to estimating error in a WLAN-based positioning system and, more specifically, to determining the expected error of an estimated position of a WLAN-enabled mobile device using WLAN-based positioning system.

2. Discussion of Related Art

Estimation is the process of finding the most probable value for a target parameter(s) based on a set of observable samples, which are correlated with the target parameter(s). Accuracy of the estimation can vary based on the quality of the observed samples. Quantifying the quality of estimation is one of the main subjects in estimation theory, and in most of the cases, it is an even harder problem than estimating the target parameter. A satellite based positioning system is one of the early systems that was introduced for global positioning, and for the same reason it is called Global Positioning System (GPS). In the GPS network, accuracy of estimation is also determined and reported to end users. The estimation error in the GPS network is presented in different ways. The error estimation is determined by considering the entire network, and it is called Delusion Of Precision (DOP) for horizontal and vertical error. The DOP value is an indicator of error, and it can be translated to error in meters as well.

Metro wide WLAN-based positioning systems have been explored by a couple of research labs, but none of them provided an expected error of position estimation. The most important research efforts in this area have been conducted by PlaceLab (www.placelab.com, a project sponsored by Microsoft and Intel), University of California San Diego ActiveCampus project (ActiveCampus—Sustaining Educational Communities through Mobile Technology, technical report #CS2002-0714), and the MIT campus wide location system.

There have been a number of commercial offerings of WLAN location systems targeted at indoor positioning. (See, e.g., Kavitha Muthukrishnan, Maria Lijding, Paul Havinga, Towards Smart Surroundings: Enabling Techniques and Technologies for Localization, *Proceedings of the International Workshop on Location and Context-Awareness* (*LoCA* 2005) at Pervasive 2005, May 2005, and Hazas, M., Scott, J., Krumm, J.: Location-Aware Computing Comes of Age, IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding, typically calling for 1-3 meter accuracy. These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly, outdoor radio propagation is fundamentally different than indoor radio propagation, rendering these indoor positioning techniques almost useless in a wide-area scenario.

There are millions of commercial and private WLANs deployed so far and this number is growing everyday. Thus, WLAN access points are used to estimate the location of WLAN-enabled mobile devices.

SUMMARY

In one aspect, the invention features a method of estimating an expected error of a position estimate for use in a WLAN positioning system that estimates the position of a WLAN-enabled device. The WLAN-enabled device receives signals transmitted by a WLAN access point in range of the WLAN-enabled device. The method estimates the position of the WLAN-enabled device based on the received signals from the WLAN access point in range of the WLAN enabled device. The method also estimates an expected error of the position estimate based on characteristics of the WLAN access point in range of the WLAN enabled device, wherein the expected error predicts a relative accuracy of the position estimate.

In another aspect of the invention, the position estimate of the WLAN-enabled device is based on signals from more than one WLAN access point in range of the WLAN-enabled device. In a further aspect, the expected error of the position estimate is based on characteristics from more than one WLAN access point in range of the WLAN-enabled device.

In yet another aspect, the expected error of the position estimate is based on the number of access points used to estimate the position of the WLAN enabled device.

In another aspect of the invention, each of the WLAN access points has an associated signal coverage area. The expected error of the position estimate is based on at least one of the signal coverage areas of the WLAN access points used to estimate the position of the WLAN-enabled device.

In a further aspect of the invention, the expected error of the position estimate is based on the smallest signal coverage area of the WLAN access points used to estimate the position of the WLAN-enabled device.

In yet a further aspect of the invention, the coverage area for each WLAN access point is estimated by determining geographic locations at which a WLAN-enabled device receives a signal from the WLAN access point, determining the standard deviation of the coverage area based on the determined geographic locations, and estimating the coverage area of the WLAN access point based on the standard deviation of the coverage area.

In one aspect of the invention, each of the WLAN access points has a geographic position, and the expected error of the position estimate is based on the spatial spread of the geographic positions of the access points used to estimate the position of the WLAN-enabled device. The spatial spread is based on a distance between the geographic positions of the WLAN access points used to estimate the position of the WLAN-enabled device.

In another aspect of the invention, a position estimate is used in conjunction with other position estimates to derive at least one of position, speed, and direction of travel of the WLAN-enabled device and the weight given to the position estimate is based on the expected error of the position estimate. In one aspect, the position estimate is used only if the expected error of the position estimate is lower than a predetermined threshold. In a further aspect, at least one of the other position estimates is based on received signals from WLAN access points in range of the WLAN enabled device. In other aspects, at least one of the other position estimates is provided by a GPS-based positioning system.

In yet a further aspect, the invention features a system for estimating an expected error of a position estimate for use in a WLAN positioning system that estimates the position of a WLAN-enabled device. The system includes: a WLAN-enabled device for receiving signals transmitted by a WLAN access point in range of the WLAN-enabled device, position estimating logic for estimating the position of the WLAN-enabled device based on the received signals from the WLAN access point in range of the WLAN enabled device, and error estimating logic for estimating an expected error of the position estimate based on characteristics of the WLAN access points in range of the WLAN enabled device, wherein the expected error predicts a relative accuracy of the position estimate.

DETAILED DESCRIPTION

Figure 1:
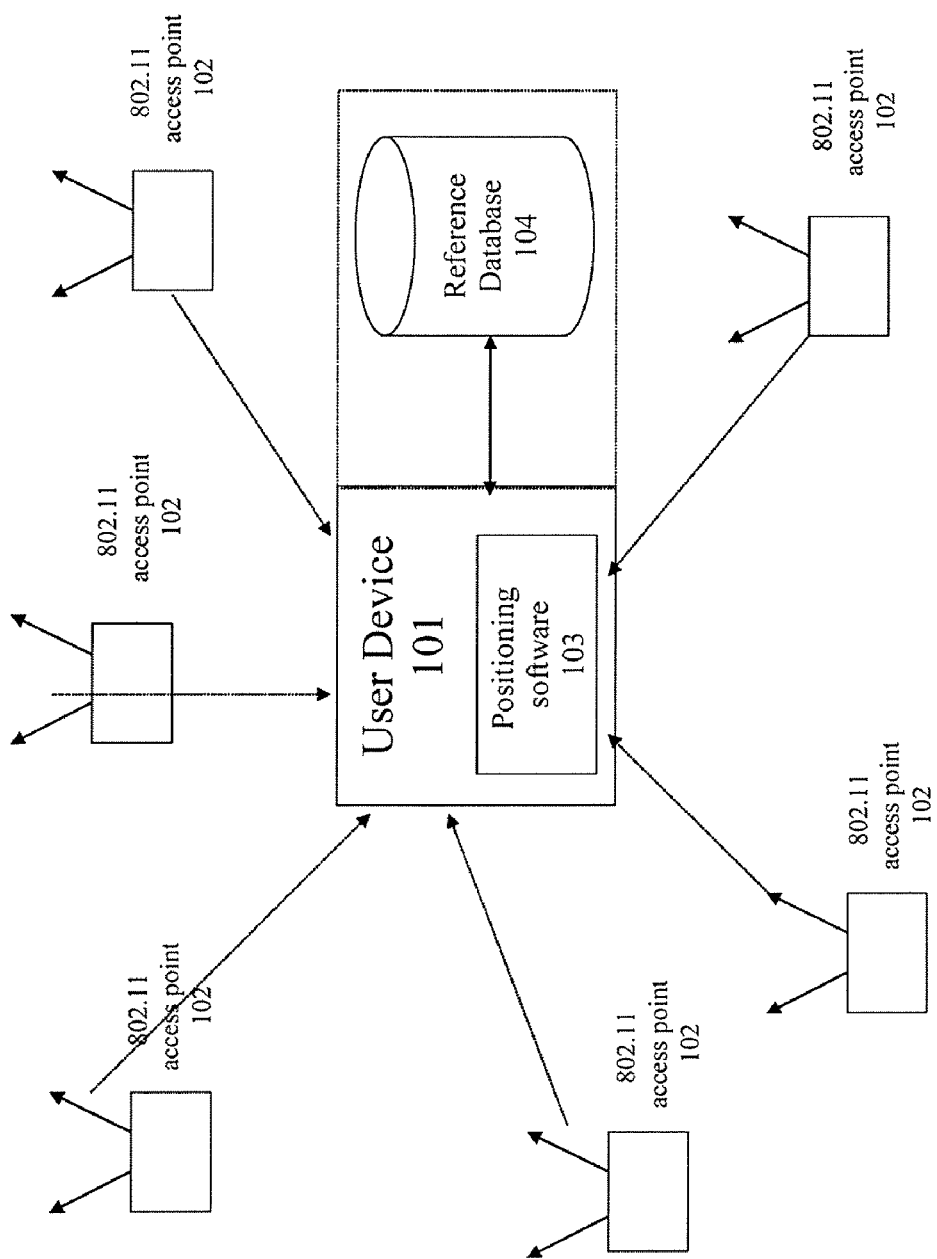
FIG. 1 illustrates certain embodiments of a WLAN positioning system.

Preferred embodiments of the invention estimate the error associated with a derived position provided by a WLAN positioning system. The incorporated patent applications describe a WLAN-based positioning system that can derive and provide estimated positions for WLAN-enabled devices.

Preferred embodiments of the invention determine and update the expected error of position estimates of a WLAN-based positioning system that use public and private WLAN access points. (Note that 802.11, 802.11b, 802.11e, 802.11n, and WiFi are examples of WLAN standards.) The user's mobile device periodically scans and detects public and private WLAN access points and also logs signals characteristics of each of the WLAN access points, for example, Received Signal Strength (RSS), Time Difference of Arrival (TDOA), or Time difference of Arrival (TOA) corresponding to each of the WLAN access points. In some embodiments, the mobile device itself determines the expected error of a position estimate. In other embodiments, the mobile device sends the results of scanning the surrounding WLAN access points to a central site where a central server determines the expected error.

The expected error of a WLAN position estimate may be used to quantify the quality of the position estimate. This may be useful when multiple position estimates are combined or when the WLAN-based position estimates are combined with other position estimation techniques, e.g., GPS position estimation. The expected error of each position estimate may be used as a weighting factor when a series of position estimates are combined. For example, in order to increase the accuracy of single position estimate, multiple position estimates may be a weighted average. In this case, the expect error of each position estimate is used as a weight in a weighted average calculation.

In addition, a series of position estimates may be combined to derive the mobile device's speed of travel or bearing. When such a series of position estimates are combined, the expected error of each estimate is used as a corresponding quality metric of the estimation, which enables the optimal combination of the series of position estimates based on their quality.

For example, in a series of ten position estimates, assume all but the seventh position estimate have a relatively low expected error of position estimation, while the seventh position estimate has a relatively high expected error. When the mobile device uses this series of position estimates to derive the speed of the mobile device, the mobile device may exclude the seventh position estimate in the speed determination because its relatively high expected error value indicates that that particular position estimate is of low quality and, thus, may be unreliable.

The expected error of a position estimates may also be used to determine the expected error after combining the position estimate results. For example, if the position estimate results are used to determine speed of travel, the expected errors of individual position estimates are combined to determine the estimation error of the speed of travel.

Certain embodiments of the invention build on techniques, systems and methods disclosed in earlier filed applications, including but not limited to U.S. patent application Ser. No. 11/261,848, entitled Location Beacon Database, U.S. patent application Ser. No. 11/261,898, entitled Server for Updating Location Beacon Database, U.S. patent application Ser. No. 11/261,987, entitled Method and System for Building a Location Beacon Database, and U.S. patent application Ser. No. 11/261,988, entitled Location-Based Services that Choose Location Algorithms Based on Number of Detected Access Points Within Range of User Device, all filed on Oct. 28, 2005, and also including but not limited to U.S. patent application Ser. No. 11/430,224, entitled Calculation of Quality of WLAN Access Point Characterization for Use in a WLAN Positioning System, and U.S. patent application Ser. No. 11/430,222, entitled Estimation of Position Using WLAN Access Point Radio Propagation Characteristics in a WLAN Positioning System, both filed on May 8, 2006, the contents of which are hereby incorporated by reference in their entirety. Those applications taught specific ways to gather high quality location data for WLAN access points so that such data may be used in location based services to determine the geographic position of a WLAN-enabled device utilizing such services and techniques of using said location data to estimate the position of a system user. The present techniques, however, are not limited to systems and methods disclosed in the incorporated patent applications. Thus, while reference to such systems and applications may be helpful, it is not believed necessary to understand the present embodiments or inventions.

FIG. 1 depicts a WLAN positioning system (WPS). The positioning system includes positioning software [103] that resides on a user device [101]. Throughout a particular target geographical area, there are fixed wireless access points [102] that broadcast information using control/common channel broadcast signals. The client device monitors the broadcast signal or requests its transmission via a probe request. Each access point contains a unique hardware identifier known as a MAC address. The client positioning software 103 receives signal beacons from the 802.11 access points 102 in range and determines the geographic location of the user device 101 using characteristics from the signal beacons. Those characteristics include the access point's MAC address and the strengths of the signal reaching the client device. The client software compares the observed 802.11 access points with those in its reference database [104] of access points, which may or may not reside on the device as well (i.e., in some embodiments, the reference database can be remotely located). The reference database contains the estimated geographic locations and power profile of all the access points the gathering system has collected. The power profile may be generated from a collection of readings that represent the power of the signal from various locations. Using these known locations and power profiles, the client software determines the relative position of the user device [101] and determines its geographic coordinates in the form of latitude and longitude readings. Those readings are then provided to location-based applications such as friend finders, local search web sites, fleet management systems and E911 services.

Preferred embodiments of the invention may be used in a WLAN-enabled device to determine and update expected error of position estimates. For example, techniques in accordance with embodiments of the invention may be incorporated in logic embedded in positioning software [103] of the WLAN-enabled device of FIG. 1.

Under one embodiment of the invention, the expected error of a position estimate of a WLAN-enabled mobile device is estimated based on the coverage area of all of the access points used to locate the WLAN-enabled mobile device. In other words, if all the detected access points are considered, the signal foot prints (or the coverage areas) of the detected access points are used to determine the expected error of the position estimate. In one illustrative implementation, the expected error of the position estimate is bounded by the smallest coverage area of the access points that are used to estimate the location of a WLAN-enabled mobile device. Therefore, the method is based on finding the smallest coverage area among the access points that are used to estimate the location of an end user in a WLAN-based positioning system. The expected error is directly correlated with the smallest coverage of detected WLAN access points. If the expected error is denoted by e, and the smallest coverage is denoted by $C_{min}$, the error can be written as a function of the smallest coverage as follows:

$$e \propto f(C_{min})$$

The notation $\propto$ means direct dependency. One example of the function is as follows:

$$e = K_c C_{min}$$

The parameter $K_c$ is a constant number to scale the value of smallest coverage area to the actual error in meters. The parameter $K_c$ translates the minimum coverage in m$^2$ to error in meters. The parameter $K_c$ is found empirically by considering enough samples in the entire coverage area and finding the actual error and the $C_{min}$ value. The actual error can be determined by comparing the estimated position provided by the WLAN positioning system with a known position.

The coverage area or the footprint of a WLAN access point is defined as the area in which a WLAN-enabled mobile device can detect the particular access point. The coverage area of an access point is found by systematically scanning a target geographical area containing many access points and recording Received Signal Strength (RSS) samples at known locations. When all the samples of a given access point are considered, the standard deviation of the location of the RSS samples is used as an indicator of the size of the coverage area of the access point. In some embodiments, all RSS samples are considered. In other implementations, some RSS samples are ignored if the RSS is below a given threshold. If the total number of RSS samples of an access point is denoted by M and the corresponding location of RSS sample i is denoted by $(x_i, y_i)$, the standard deviation, $\sigma$, of coverage area is calculated as follows:

$$\sigma = \sqrt{\sigma_x^2 + \sigma_y^2},$$

in which $\sigma_x$ and $\sigma_y$ are the standard deviation of $x_i$ and $y_i$ over all M samples, respectively.

Figure 2:
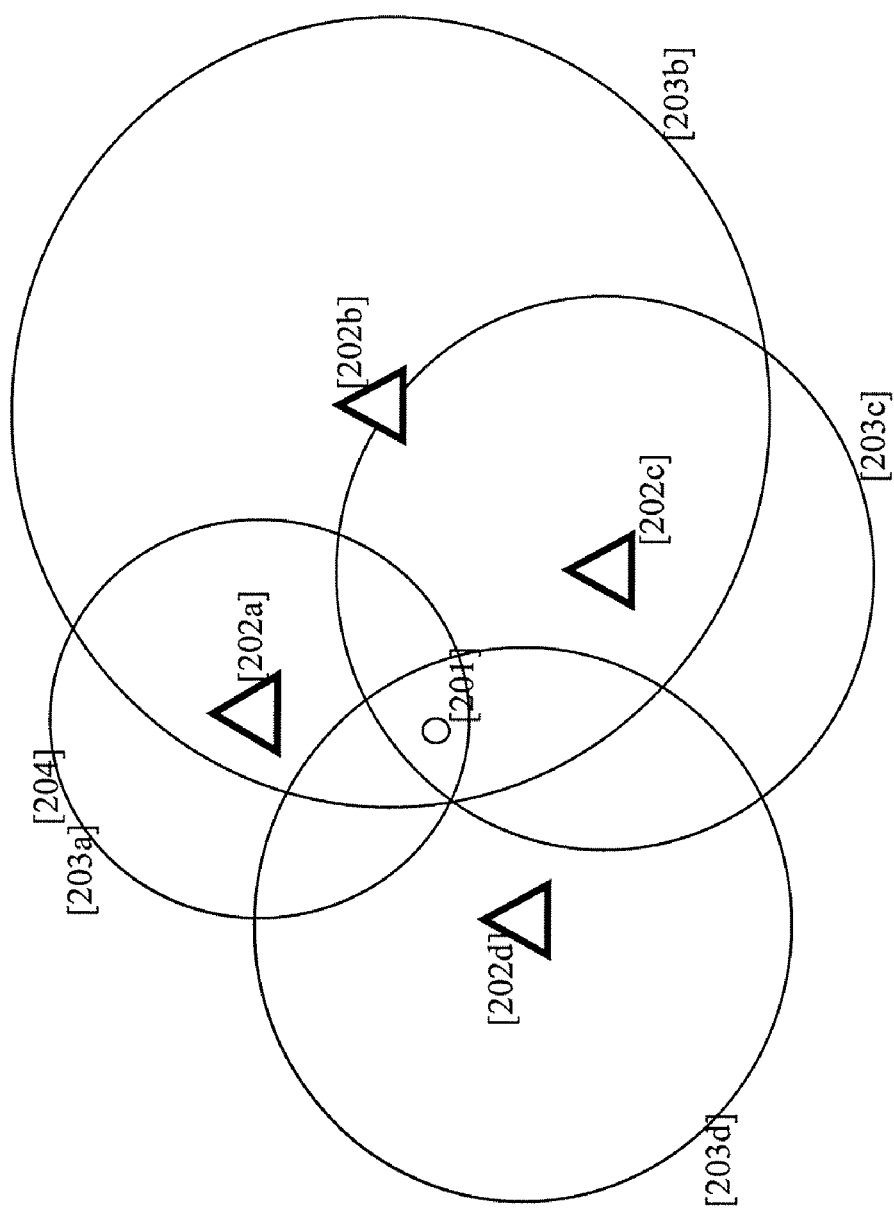
FIG. 2 illustrates an example of a WLAN-enabled mobile device and surrounding access points and their corresponding coverage areas.

FIG. 2 illustrates an example of a WLAN-enabled mobile device and WLAN access points in its surroundings. In FIG. 2, the user [201] detects WLAN access points [202a-d] in range and estimates its location by using the detected WLAN access points as reference points. The access points [202a-d] in range have different coverage sizes [203a-d]. The estimation error is bounded by the minimum coverage [204] of the detected access points [202a-d]. For example, if the radius of the coverage area [203a] of the access point [202a] is 100 meters, the maximum estimation error corresponding to the position of user [201] is 100 meters.

Figure 3:
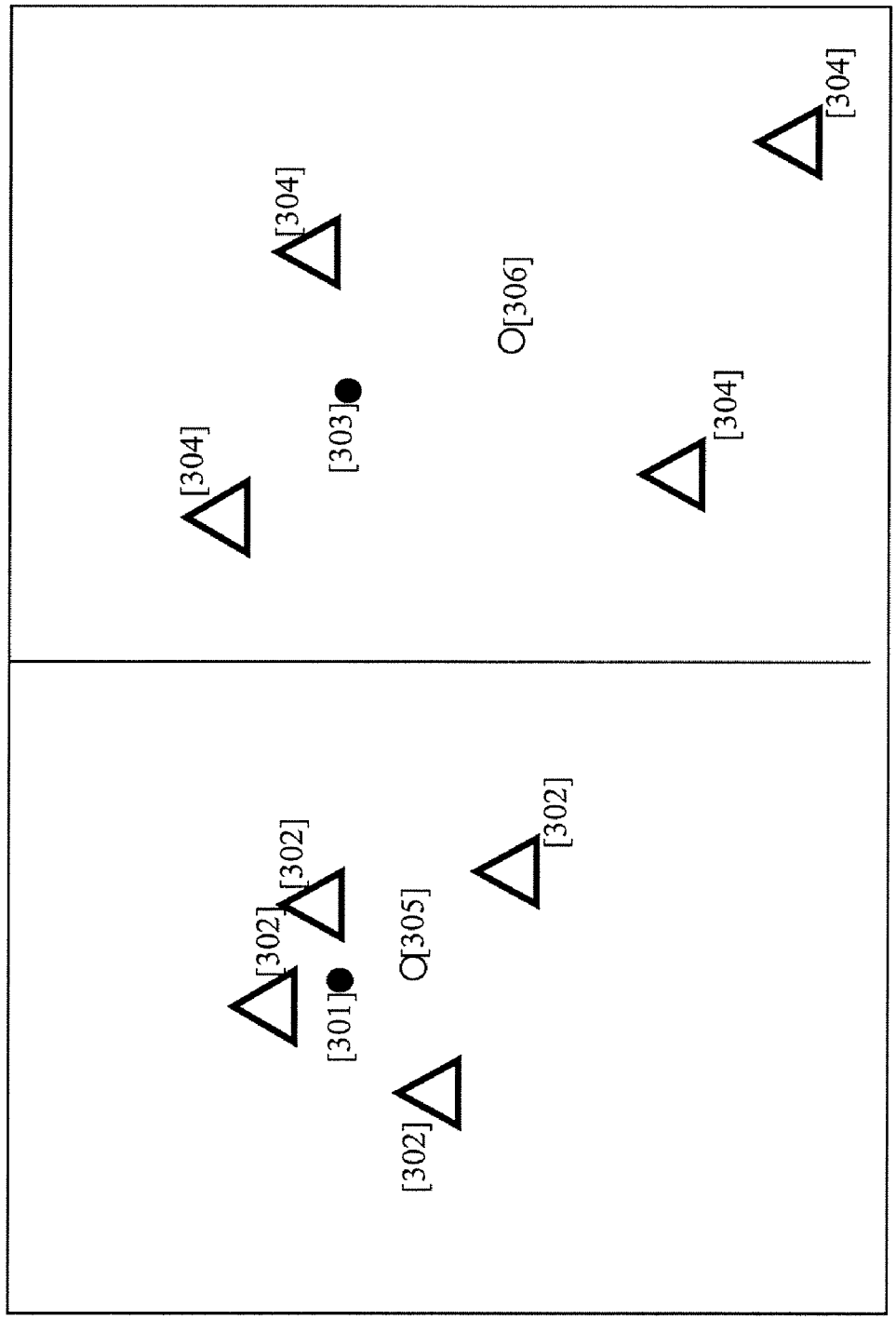
FIG. 3 illustrates an example of the impact of the spatial spread of detected WLAN access points on the accuracy of position estimation of a WLAN-enabled mobile device.

Under other embodiments of the invention, the expected error of a position estimation is estimated based on how the detected access points are spatially spread, i.e., the distance between the geographic location of the detected access points. An example of the impact of the spatial spread of the detected access points on the position estimation error is illustrated in FIG. 3. FIG. 3 illustrates a WLAN-enabled mobile device [301] with detected access points [302] and WLAN-enabled mobile device [303] with detected access points [304]. The estimated location of mobile devices [301] and [303] are shown by circles [305] and [306] respectively. The figure illustrates a smaller estimation error for mobile device [301] with a relatively smaller spatial spread of detected access points than mobile device [303], which has a relatively larger spatial spread of detected access points. The spatial spread of access points can be measured by the standard deviation of their location in the X and Y axis, $\sigma_{sx}$ and $\sigma_{sy}$, and then finding the total spatial spread standard deviation as follows:

$$\sigma_s = \sqrt{\sigma_{sx}^2 + \sigma_{sy}^2}$$

The expected error directly correlates with the standard deviation of spatial spread. So, $$e \propto f(\sigma_s).$$

An example of the above function is as follows:

$$e = K_s \sigma_s^2$$

The parameter $K_s$ is a constant number to scale the output value to error in meters. The parameter $K_s$ translates the square of the standard deviation in m² to error in meters. The parameter $K_c$ is found empirically by considering enough samples in the entire coverage area and finding the actual error and the standard deviation square value. Error in meters is calculated by using the technique described above.

Figure 4:
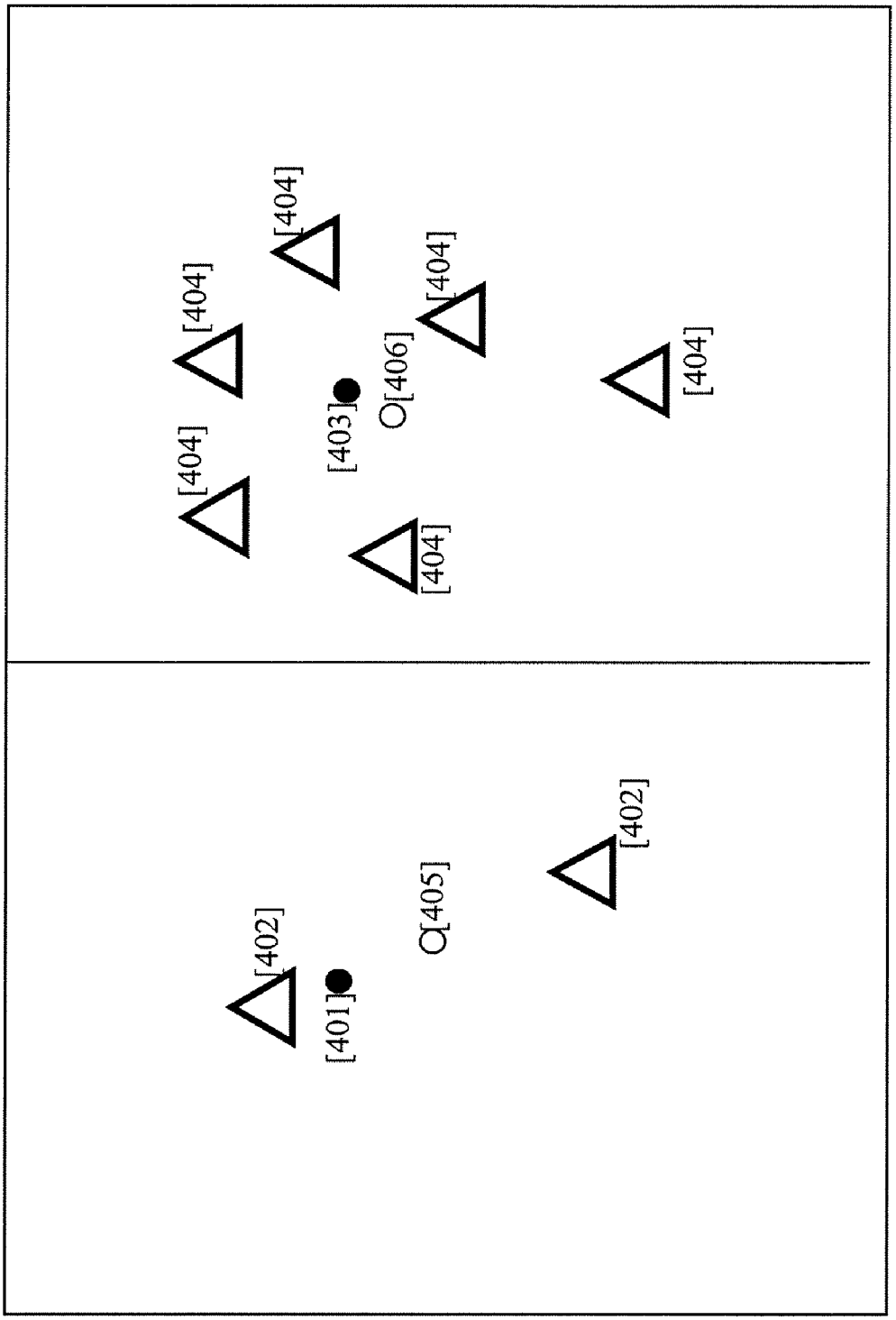
FIG. 4 illustrates an example of the impact of the number of detected WLAN access points on the accuracy of a position estimate of a WLAN-enabled mobile device.

Under other embodiments of the invention, the expected error of a WLAN-enabled mobile device in a WLAN positioning system is estimated based on the number of access points that are detected. As illustrated in FIG. 4, the expected error decreases as the number of detected access points increases. FIG. 4 shows two WLAN-enabled mobile devices [401] and [403], with detected access points [402] and [404], respectively, and estimated positions [405] and [406], respectively. The figure illustrates that the expected error of position estimation is lower for WLAN-enabled mobile device [403] because of the greater number of access points used to estimate it position. Therefore, the expected error is correlated with the inverse of the number of detected access points. If N denotes the number of detected access points that are used to locate an end user, the expected error can be written as follows:

$$e \propto f\left(\frac{1}{N}\right)$$

An example of the above function is as follows:

$$e = K_N \frac{1}{\sqrt{N}}$$

The parameter $K_N$ is a constant number to scale the output of the equation to error in meters. In terms of units, the parameter $K_N$ is in meters. The parameter $K_N$ is found empirically by considering enough samples in the entire coverage area and finding the actual error and the N value. Error in meters is calculated by using the technique described above.

Under other embodiments of the invention, the expected error of a WLAN-enabled mobile device in a WLAN positioning system is estimated based on combining multiple correlated parameters with error. The three parameters correlated with the expected error of a position estimate are as follows: (1) the smallest coverage of detected access points, $C_{min}$, (2) one over square root of number of detected access points, $1/\sqrt{N}$, (3) square of spatial spread of detected access points, $\sigma_s^2$.

The above parameters are correlated with the expected error, but in terms of the absolute value they have different dynamic ranges. In order to be able to combine them, their absolute values have to be normalized first. Normalization of the parameters is achieved by dividing them by the standard deviation of their dynamic range. The dynamic range is the largest and smallest absolute values of all of the access points in a given coverage area.

The normalized parameters can be simply averaged or they can be weighted according to the accuracy with which each parameter predicts the expected error and then averaged, which is called the weighted average. Weighting each component of error according to its accuracy of error prediction is more desirable and it is the optimum combining method. The next step in the weighted average approach is defining a metric for each of the parameters that measures the accuracy of the error prediction.

The correlation of each parameter with the error measures the accuracy of the error prediction of the particular error estimation method. These correlation coefficients are used to weight each method in the weighted average calculation. A correlation coefficient is a statistical parameter, and it is determined globally for each parameter based on a sufficient number of samples for the targeted geographic area by finding the actual error of a position estimate and also finding the estimated value of the parameter and then determining the correlation coefficient. Therefore, the correlation coefficient shows the statistical correlation of an estimation parameter with estimation error, and it does not show exactly the quality of one sample of the parameter. For example, one instance of a position determination might have a very small estimation error, but the smallest coverage area of the detected access points might be relatively large. In this example, the smallest coverage area of the detected access points is not a good indicator of the error, but it is still weighted with the same correlation coefficient as other samples. Therefore, the expected error using weighted average of the error parameters is written as follows:

$$e \propto \left[ C_c \frac{C_{min}}{\sigma(C_{min})} + C_N \frac{\sqrt{\frac{1}{N}}}{\sigma\left(\sqrt{\frac{1}{N}}\right)} + C_s \frac{\sigma_s^2}{\sigma(\sigma_s^2)} \right] \times \frac{1}{(C_c + C_N + C_s)}$$

In the above equation, the standard deviation operator is shown with $\sigma$ and the correlation coefficients for $C_{min}$, N, and $\sigma_s$ are shown with $C_c$, $C_N$, and $C_s$, respectively. The correlation coefficients are unitless. The correlation coefficients are found empirically by considering enough samples in the entire coverage area and comparing the expected error with the actual error for each sample.

Under other embodiments of the invention, the expected error of a position estimate is found in meters from a parameter that is correlated with the expected error. Assuming that there is a parameter correlated with the expected error, the estimation error in meters is found by mapping the distribution of the error parameter into the actual distance error in meters as found during scanning the targeted geographic area. Therefore, if error in meters is denoted by $d_e$, it is found as the result of the mapping and can be calculated as follows:

$$d_e = \left(\frac{e - \bar{e}}{\sigma(e)}\right)\sigma(d_e) + \bar{d}_e$$

Note that the average value of a random process is shown with a bar on the variable and the standard deviation operator is shown with σ. The average and the standard deviation of $d_e$ and e are found empirically by considering the distribution of these parameters over samples that are collected from the entire coverage area. An example of the standard deviation and the average value of the parameters are as follows:

$\sigma(C_{min})$=2.7546

$\sigma(\sqrt{1/N})$=0.1721

$\sigma(\sigma_s^2)$=3.8707×10$^{-7}$ $\bar{e}$=1.5613

$\sigma_e$=0.7458

$\bar{d}_e$=38.1 m $\sigma_{d_e}$=29.0 m

Note that the standard deviation of spatial spread of detected access points is determined based on the latitude and longitude of access points.

An example of the correlation coefficients is as follows:

0.30≤$C_c$, $C_N$, $C_s$≤0.37

It will be appreciated that the scope of the present invention is not limited to the above described embodiments, but rather is defined by the appended claims; and that these claims will encompass modifications of and improvements to what has been described.

What is claimed is:

1. In a Wireless Local Area Network (WLAN) positioning system for estimating the position of a WLAN-enabled device, a method of estimating an expected error of a position estimate, a method comprising:
the WLAN-enabled device receiving signals transmitted by at least one WLAN access point in range of the WLAN-enabled device;
estimating the position of the WLAN-enabled device based on the received signals from the at least one WLAN access point in range of the WLAN enabled device; and
estimating an expected error, in terms of distance, of the position estimate based on characteristics of the at least one WLAN access point used for estimating the position of the WLAN-enabled device, wherein the expected error predicts a relative accuracy of the position estimate in terms of distance.

2. The method of claim 1, wherein estimating the position of the WLAN-enabled device is based on signals from more than one WLAN access point in range of the WLAN-enabled device.

3. The method of claim 1, wherein estimating the expected error of the position estimate is based on characteristics from more than one WLAN access point in range of the WLAN-enabled device.

4. The method of claim 1, wherein each of the at least one WLAN access points has an associated signal coverage area, and wherein estimating the expected error of the position estimate is based on at least one of the signal coverage areas of the at least one WLAN access points used to estimate the position of the WLAN-enabled device.

5. The method of claim 4, wherein estimating the expected error of the position estimate is based on a smallest signal coverage area of the WLAN access points used to estimate the position of the WLAN-enabled device.

6. The method of claim 5, wherein the expected error of the position estimate is directly proportional to the smallest signal coverage area of the WLAN access points used to estimate the position of the WLAN-enabled device.

7. The method of claim 4, wherein the coverage area for each WLAN access point is estimated by the method comprising:
determining geographic locations at which a WLAN-enabled device receives a signal from the WLAN access point;
determining a standard deviation of the coverage area based on the determined geographic locations; and
estimating the coverage area of the WLAN access point based on the standard deviation of the coverage area.

8. The method of claim 1, wherein each of the at least one WLAN access points has a geographic position, and wherein estimating the expected error of the position estimate is based on a spatial spread of the geographic positions of the access points used to estimate the position of the WLAN-enabled device, the spatial spread being based on a distance between the geographic positions of the WLAN access points used to estimate the position of the WLAN-enabled device.

9. The method of claim 8, wherein the expected error of the position estimate is directly proportional to the square of the standard deviation of the spatial spread of the geographic positions of the access points used to estimate the position of the WLAN-enabled device.

10. The method of claim 1, wherein the WLAN-enabled device estimates the expected error of the position estimate.

11. The method of claim 1, wherein a server system estimates the expected error of the position estimate.

12. The method of claim 1, wherein the position estimate is used in conjunction with other position estimates to derive at least one of position, speed, and direction of travel of the WLAN-enabled device and a weight given to the position estimate is based on the expected error of the position estimate.

13. The method of claim 12, wherein the position estimate is used only if the expected error of the position estimate is lower than a predetermined threshold.

14. The method of claim 12, wherein at least one of the other position estimates is based on received signals from WLAN access points in range of the WLAN enabled device.

15. The method of claim 12, wherein at least one of the other position estimates is provided by a GPS-based positioning system.

16. The method of claim 1, wherein estimating the expected error of the position estimate is based on a weighted average of a first expected error value estimated based on the number of access points used to estimate the position of the WLAN enabled device, a second expected error value estimated based on a smallest signal coverage area of the WLAN access points used to estimate the position of the WLAN-enabled device, and a third expected error value estimated based on a spatial spread of the geographic positions of the access points used to estimate the position of the WLAN-enabled device, the spatial spread being based on a distance between the geographic positions of the WLAN access points used to estimate the position of the WLAN-enabled device.

17. The method of claim 16, wherein the first, second, and third expected error values are weighted according to corresponding correlation coefficients, each correlation coefficient measuring the accuracy with which its corresponding expected error value predicts the actual error.

18. In a Wireless Local Area Network (WLAN) positioning system for estimating the position of a WLAN-enabled device, a system for estimating an expected error of a position estimate, the system for estimating the expected error comprising:
   a WLAN-enabled device for receiving signals transmitted by at least one WLAN access point in range of the WLAN-enabled device;
   position estimating logic for estimating the position of the WLAN-enabled device based on the received signals from the at least one WLAN access point in range of the WLAN enabled device; and
   error estimating logic for estimating an expected error, in terms of distance, of the position estimate based on characteristics of the at least one WLAN access point used for estimating the position of the WLAN-enabled device, wherein the expected error predicts a relative accuracy of the position estimate in terms of distance.

19. The system of claim 18, wherein the position estimating logic is executed on the WLAN-enabled device.

20. The system of claim 18, wherein the position estimating logic is executed on a server system.

21. In a Wireless Local Area Network (WLAN) positioning system for estimating the position of a WLAN-enabled device, a method of estimating an expected error of a position estimate, a method comprising:
   the WLAN-enabled device receiving signals transmitted by at least one WLAN access point in range of the WLAN-enabled device;
   estimating the position of the WLAN-enabled device based on the received signals from the at least one WLAN access point in range of the WLAN enabled device; and
   estimating an expected error, in terms of distance, of the position estimate based on the number of access points used to estimate the position of the WLAN-enabled device, wherein the expected error predicts a relative accuracy of the position estimate in terms of distance.

22. The method of claim 21, wherein the expected error of the position estimate is inversely proportional to the square root of the number of access points used to estimate the position of the WLAN enabled device.

* * * * *